US 12,116,813 B2

(12) United States Patent
McEwen et al.

(10) Patent No.: US 12,116,813 B2
(45) Date of Patent: Oct. 15, 2024

(54) COMBINATION VEHICLE DOOR GUIDE AND PROTECTOR (71) Applicants: Michael McEwen, Gray, TN (US); Tyler McEwen, Gray, TN (US)

(72) Inventors: Michael McEwen, Gray, TN (US); Tyler McEwen, Gray, TN (US)

( * ) Notice: Subject to any disclaimer, the term of this patent is extended or adjusted under 35 U.S.C. 154(b) by 329 days.

(21) Appl. No.: 17/820,625

(22) Filed: Aug. 18, 2022

(65) Prior Publication Data
US 2023/0055728 A1 Feb. 23, 2023

Related U.S. Application Data (60) Provisional application No. 63/260,364, filed on Aug. 18, 2021.

(51) Int. Cl.
*E05D 7/10* (2006.01)
*E05D 11/00* (2006.01)
*B60J 5/04* (2006.01)

(52) U.S. Cl.
CPC ......... *E05D 11/0054* (2013.01); *B60J 5/0487* (2013.01); *E05D 2007/1094* (2013.01)

(58) Field of Classification Search
CPC . E05D 11/0054; E05D 11/00; E05D 11/0009; E05D 11/0018; E05D 7/1044; E05D 7/1083; E05D 2007/1094; E05D 2011/0072; B21D 53/40; B21K 13/02; B62D 65/026; B62D 65/06; B60J 5/0487; E05Y 2600/56; E05Y 2800/409; E05Y 2800/692; E05Y 2900/531
(Continued)

(56) References Cited

U.S. PATENT DOCUMENTS 5,432,979 A 7/1995 Harper
7,178,197 B2 2/2007 Verheye, Sr.
(Continued)

FOREIGN PATENT DOCUMENTS

DE 29706761 U1 * 8/1997 ........... E05D 7/1083
DE 202008009019 U1 * 10/2008 ............. E05D 11/00
(Continued)

OTHER PUBLICATIONS

Englert (EP 1041231 A2), machine translation (Year: 2000).*

*Primary Examiner* — Amy R Weisberg
*Assistant Examiner* — Wenwei Zhuo
(74) *Attorney, Agent, or Firm* — Sheri Higgins; Sheri Higgins Law, PLLC (57) ABSTRACT

A combination door guide and protector can be used to safely and easily attach or remove vehicle doors. A set of two guides can be used for each door. Each guide can include a forward curved portion and a second curved portion that extend outwardly away from a body and form a groove. Each guide also includes a crenellated void. A body can connect the two guides and can extend away from each side of the curved portions to provide protection to the vehicle frame and body. The crenellated voids can be placed on top of weldments of hinge pin receivers located on the vehicle body frame. Hinge pin housings on the vehicle door can be slid within the groove until hinge pins on the door engage with the hinge pin receivers. The combination device makes it easier to align the hinge pins with hinge pin receivers.

20 Claims, 6 Drawing Sheets

(58) Field of Classification Search
USPC .......... 296/146.11, 148; 49/463, 254; 29/11
See application file for complete search history.

(56) References Cited

U.S. PATENT DOCUMENTS

| | | |
|---|---|---|
| 7,267,384 B1 | 9/2007 | Coviello |
| 9,347,249 B2 | 5/2016 | Marshall et al. |
| 9,708,841 B1 | 7/2017 | Kar |
| 10,399,486 B2 | 9/2019 | Salter et al. |
| 10,550,615 B2 | 2/2020 | Cherry et al. |
| 2008/0276421 A1 | 11/2008 | Vanderpan |

FOREIGN PATENT DOCUMENTS

| | | | | |
|---|---|---|---|---|
| DE | 202017004953 U1 | * | 11/2017 | |
| EP | 1041231 A2 | * | 10/2000 | ........... E05D 7/1083 |
| FR | 2970020 A1 | * | 7/2012 | ............. B62B 1/268 |
| NL | 1036508 C | * | 8/2010 | .......... E04F 21/0007 |
| WO | WO-2006134615 A1 | * | 12/2006 | .......... E04F 21/0015 |

* cited by examiner

COMBINATION VEHICLE DOOR GUIDE AND PROTECTOR

TECHNICAL FIELD

The field relates to a combination device that is a guide and protector for attaching and removing vehicle doors. The combination device has a guide for assisting with attaching a vehicle door and a body that protects the vehicle from damage.

BRIEF DESCRIPTION OF THE FIGURES

The features and advantages of the embodiments will be more readily appreciated when considered in conjunction with the accompanying figures. The figures are not to be construed as limiting any of the embodiments.

DETAILED DESCRIPTION

Some vehicles have doors that are removable. JEEP®, for example, is a marque of car manufacturer Stellantis North America that offers several models with removable doors. Other car manufacturers, such as Ford, offer models with removable doors. For 2-door models, the driver-side door and the passenger-side door can be removed. For 4-door models, all 4 doors can be removed, or the driver- and front-passenger doors can be removed. Removable doors can be quite appealing to consumers.

Each removable door has an upper and lower hinge assembly. Each hinge assembly can include a hinge pin receiver that is permanently attached to the vehicle body frame via a weldment and a hinge pin housing that houses a hinge pin that is located on the vehicle door. When the vehicle door is attached to the vehicle, the hinge pins are aligned with an opening on the hinge pin receivers and moved downward toward the ground to position the hinge pins within the openings. When the vehicle door is removed from the vehicle body frame, the door is lifted in an upwards direction away from the ground until the hinge pins on the door completely clear the hinge pin receivers. The door can then be stored until a time when it is desirable to reattach the door.

Removing and attaching removable vehicle doors can be quite challenging, time consuming, and frustrating. For example, each door can weigh 50+ pounds and this weight can determine how long a person is physically capable of holding the door during the removal or attachment process. Another challenge is trying to align both hinge pins with both of the openings in the hinge pin receivers because it is very easy for the top or bottom of the door to move out of the vertical alignment that is necessary to line up both hinge pins with the openings—especially considering the heavy weight of the door. Trying to align both hinge pins simultaneously while holding a heavy door can be time consuming and extremely frustrating. Moreover, one wrong move of the door during the removal or attachment process—for example, if the hinge pin slips off the top of the hinge pin receiver and/or the hinge pin makes contact with the vehicle—can result in damage to the vehicle body. It is not uncommon to scratch the paint, gouge into the metal, or dent the vehicle body frame when trying to attach or remove the vehicle doors. Accordingly, there exists a long-felt need for a device that can guide the hinge pins into attachment with the hinge pin receiver. There also exists a long-felt need for a device that can protect the body of the vehicle when attaching and removing vehicle doors.

It has been discovered that a combination device can include a guide and a protector for attaching and removing vehicle doors. The guides make it easier to vertically align the hinge pins with the openings in the hinge pin receivers. The combination device also provides protection against damage to the vehicle body when removing and attaching the vehicle doors.

A combination device for attaching or removing vehicle doors can include: a body; a first guide and a second guide, wherein the first and second guides are vertically aligned with each other, wherein the first and second guides each comprise: a forward curved portion; a rear curved portion; and a crenellated void, wherein the forward and rear curved portions extend outwardly away from a plane of the body and form a groove within the guide, and wherein the body extends away from both sides of the forward and rear curved portions.

Figure 1:
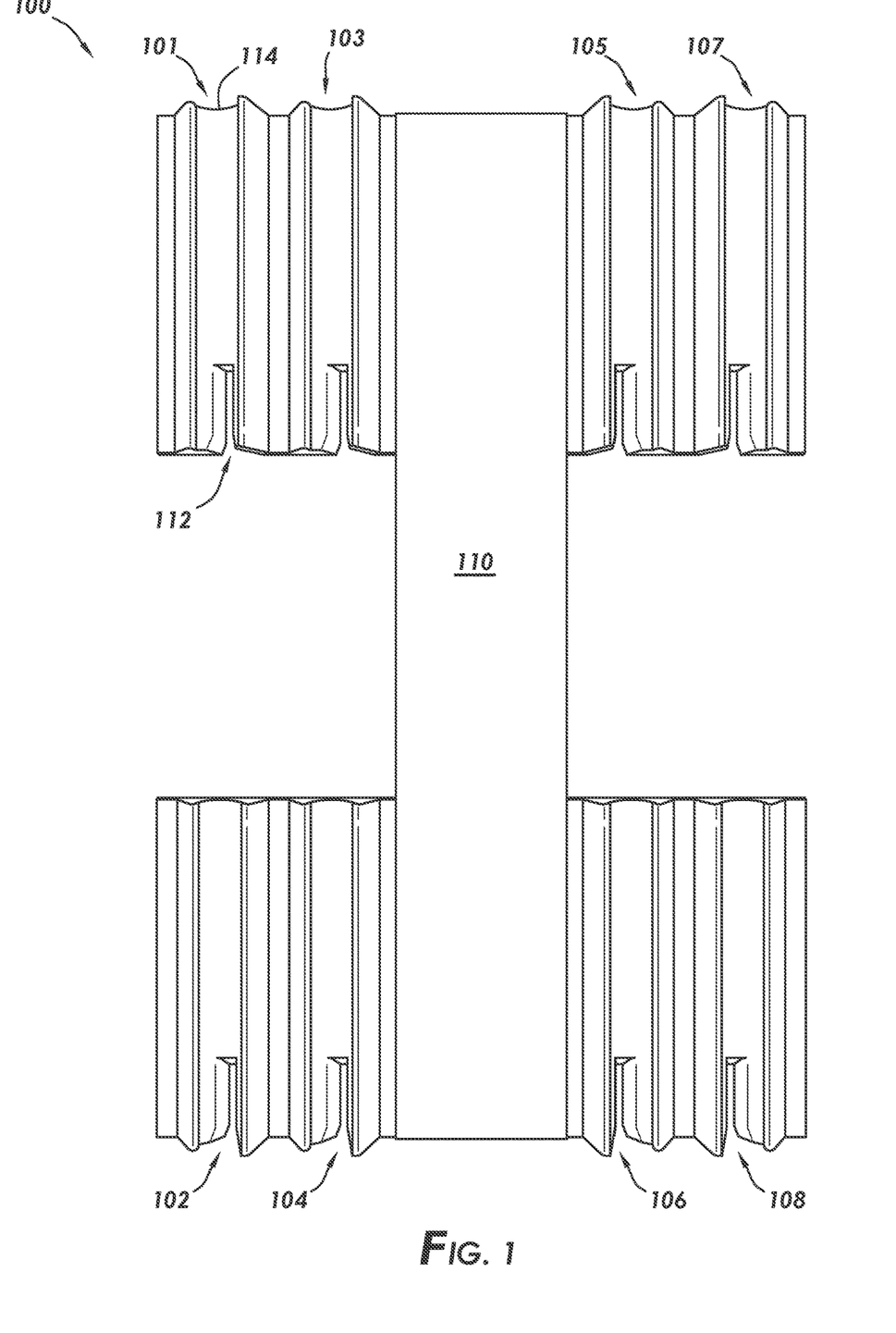
FIG. 1 is a front, perspective view of a combination device for use as a vehicle door guide and protector according to certain embodiments.

FIG. 1 is a front, perspective view of a door guide and protector 100 according to any of the embodiments. The door guide and protector 100 can include a first guide 101 and a second guide 102. The first and second guides 101/102 are vertically aligned with each other. The first and second guides 101/102 can comprise a first set of guides. There can also be multiple sets of guides. For example, and as shown in FIG. 1, there can also be a third guide 103, a fourth guide 104, a fifth guide 105, a sixth guide 106, a seventh guide 107, and an eighth guide 108. Any 2 guides that are vertically aligned with each other can comprise a second set of guides. By way of example, the third guide 103 and the fourth guide 104 can comprise a second set of guides, the fifth guide 105 and the sixth guide 106 can correspond to a third set of guides, and the seventh guide 107 and the eighth guide 108 can correspond to a fourth set of guides. Any of the sets of guides can be configured to correspond to a particular vehicle door. By way of example, the first set of guides can correspond to a front driver-side door, the second set of guides can correspond to a rear driver-side door, the third set of guides can correspond to a front passenger-side door, and the fourth set of guides can correspond to a rear passenger-side door. In some cases, there may only need to be one set of guides.

Figure 2:
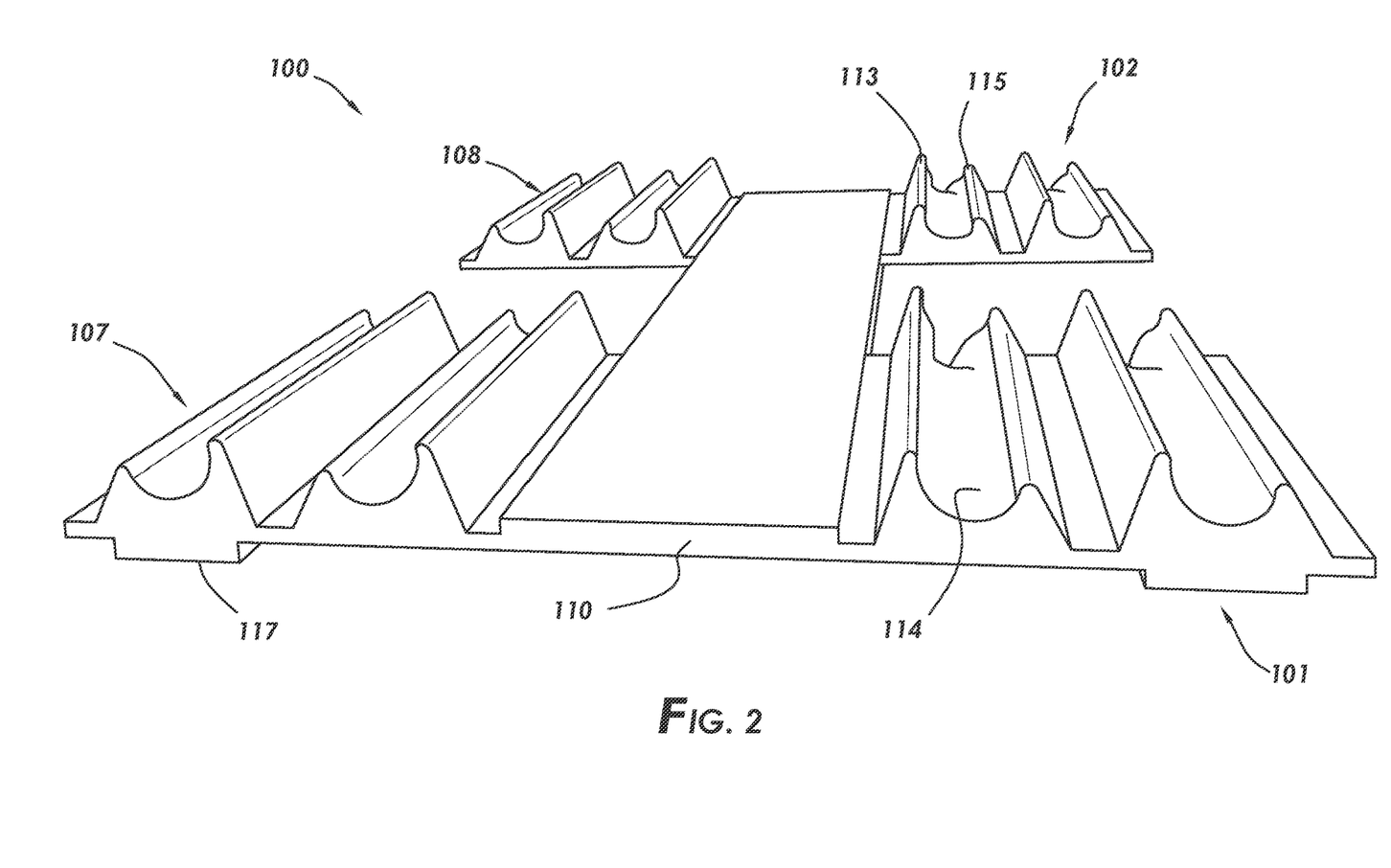
FIG. 2 is a top, perspective view of the door guide and protector.

As shown in FIGS. 1 and 2, each of the guides (e.g., the first and second guides 101/102) can include a forward curved portion 115 and a rear curved portion 113. The forward curved portion 115 and the rear curved portion 113 extend outwardly away from a front plane of the body and form a groove 114 within the guide. Each of the guides can include a crenellated void 112. The crenellated void 112 can be located on a bottom end of the guide, for example, as shown in FIG. 1.

The door guide and protector 100 also includes a body 110. The body 110 can span vertically between the forward curved portion 115 or the rear curved portion 113 of any set of guides, for example spanning between the forward curved portion 115 of the third and fourth guides 103/104 shown in FIG. 2. When more than one set of guides is included, the body 110 can span vertically between the forward curved portion 115 of one set of guides and the rear curved portion 113 of another set of guides. According to any of the embodiments, at least a portion of the body 110 connects two guides of a set of guides, for example, the first guide 101 and the second guide 102. As shown in FIGS. 1 and 2, the body 110 connects sets of guides by vertically spanning between the third and fourth guides 103/104 and the fifth and sixth guides 105/106. According to any of the embodiments, the body 110 does not extend below the crenellated voids 112.

The body 110 can planarly extend away from both sides of each guide. In this manner, damage to the vehicle body is eliminated or reduced. The dimensions, thickness, and geometry of the body can vary and can be selected to provide the maximum protection to the vehicle body. By way of example and with reference to FIGS. 1-3, the body 110 can extend between the rear curved portion 113 of the first guide 101 and the forward curved portion 115 of the third guide 103, the rear curved portion of the second guide 102 and the forward curved portion of the fourth guide 104, the rear curved portion 113 of the fifth guide 105 and the forward curved portion 115 of the seventh guide 107, and the rear curved portion of the sixth guide 106 and the forward curved portion of the eighth guide 108. The body 110 can also extend away from the outermost curved portions, for example, the rear curved portions 113 of the first and second guides 101/102 and the rear curved portions 113 of the seventh and eighth guides 107/108.

Figure 3:
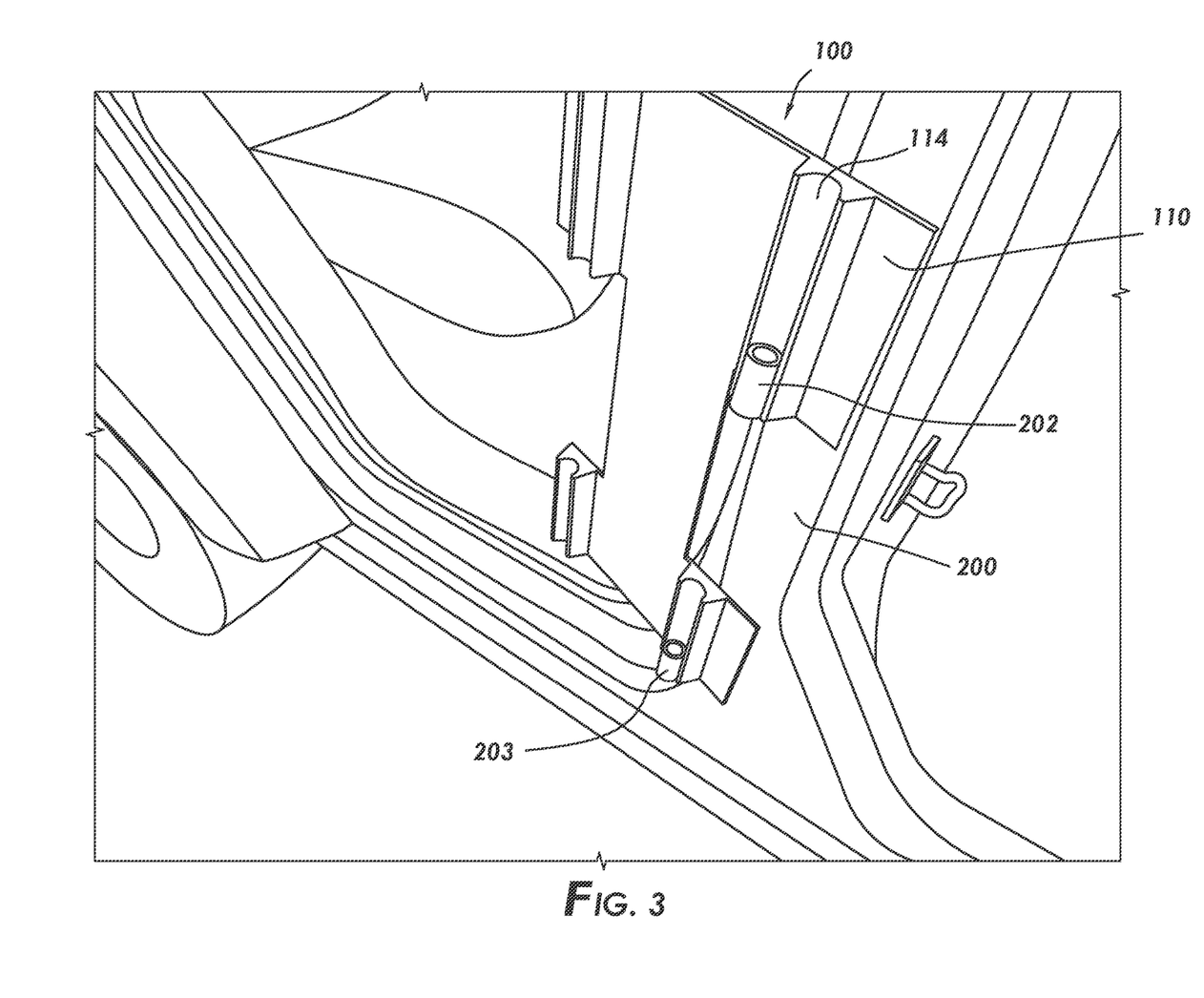
FIG. 3 is a front view of the door guide and protector being positioned on a frame of a vehicle according to certain embodiments.
Figure 4:
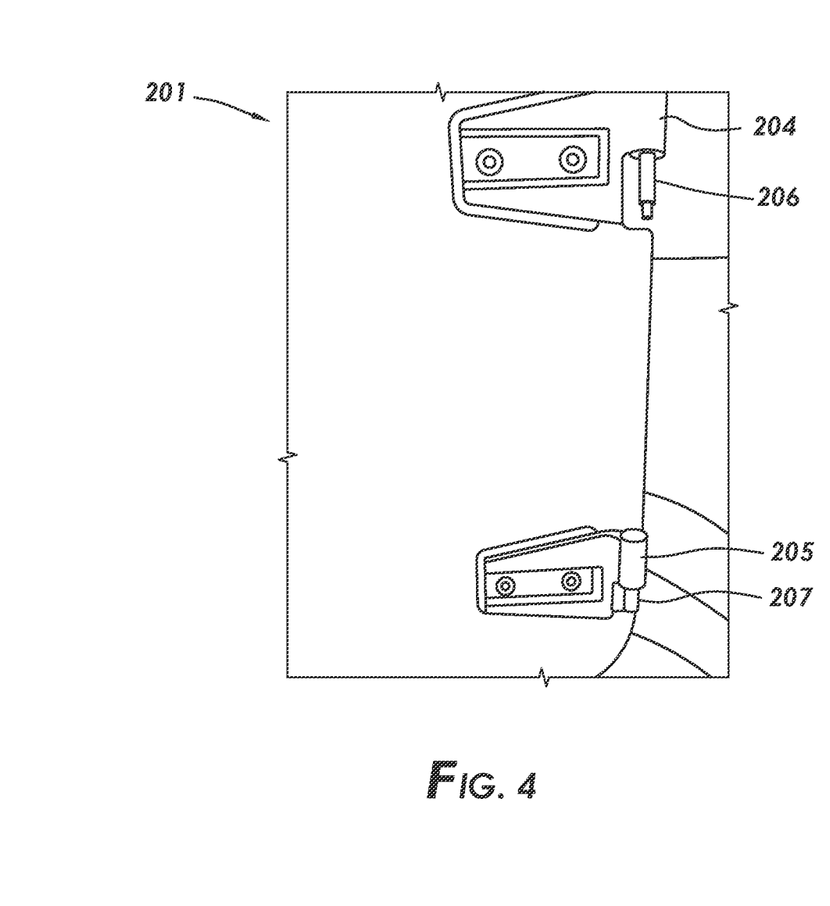
FIG. 4 is a front view of a vehicle door showing a hinge pin housings and hinge pins.
Figure 5:
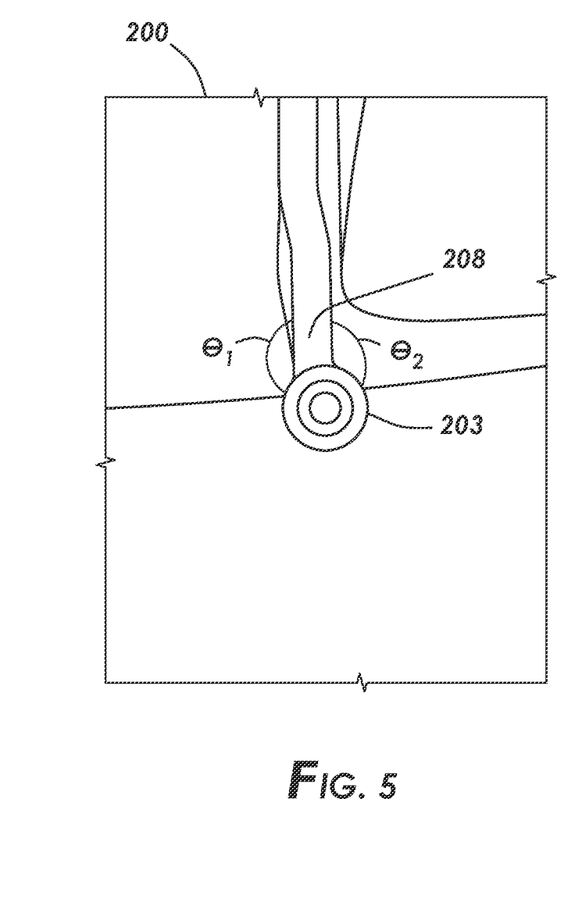
FIG. 5 is a top view of a bottom hinge pin receiver according to certain embodiments.

Referring now to FIGS. 3-5, the door guide and protector 100 is used for attaching and removing vehicle doors of a vehicle. FIG. 3 shows the door guide and protector 100 positioned on the vehicle for attaching a rear passenger-side door. The vehicle includes a vehicle body frame 200. An upper hinge pin receiver 202 and a lower hinge pin receiver 203 are attached to the vehicle body frame 200 via a weldment 208 as shown in FIG. 5. FIG. 5 shows the weldment 208 for a driver-side door, wherein $\theta_1$ is located closer to the hood of the vehicle and 02 is located closer to the rear of the vehicle. The length of the weldment 208 (i.e., the distance from the vehicle body frame 200 to the beginning of the curve of the hinge pin receiver located closest to the vehicle body frame) can vary between car manufacturer models and also between the front doors and rear doors of a given model. By way of example, the length of the weldments 208 for the front doors may be longer than the length of the weldments for the rear doors. With reference to FIG. 2, the door guide and protector 100 can further include two or more weldment extenders 117. Because the length of the weldments 208 will be the same for a particular door and because a set of guides is used for each door, then a first and second weldment extender 117 can correspond to a set of guides, for example, the first and second guides 101/102. The weldment extenders 117 can be located on a back side of the guides and extend a desired distance away from the back side of the guides. The weldment extenders 117 can span partially or wholly from a top portion of the guides to the top of the crenellated voids 112 of the guides. Preferably, if weldment extenders 117 are used, the weldment extenders 117 do not extend into the crenellated voids 112 in order to allow the door guide and protector 100 to be placed onto the upper and lower hinge pin receivers 202/203. The desired distance that the weldment extenders 117 extend away from the back side of the guides can be selected such that the body 110 is mostly flush with the vehicle body frame 200 after placing the door guide and protector 100 onto the upper and lower hinge pin receivers 202/203. By way of example, if the weldments 208 for the front doors are 0.5 inches longer than the weldments for the rear doors, then the set of guides used for the front doors can include weldment extenders 117 that extend approximately 0.5 inches away from the back side of the corresponding guides.

FIG. 3 shows the door guide and protector 100 positioned on a vehicle for attaching a rear passenger-side vehicle door to the vehicle. The door guide and protector 100 is shown in FIG. 3 with a total of two sets of guides, wherein each set comprises two guides that are vertically aligned and vertically positioned a desired distance apart from each other. The door guide and protector 100 is positioned onto the vehicle body frame 200 by a mating engagement of the crenellated voids 112 of the first and second guides 101/102, for example, with the upper and lower hinge pin receivers 202/203. The forward curved portion 115 and the rear curved portion 113 of the crenellated voids 112 slidingly engage with the outside of the upper and lower hinge pin receivers 202/203. In this manner, the protruding sides of the crenellated voids partially surround the outside of the hinge pin receivers, and the combination device is moved down towards the ground until the top of the crenellated voids engage with the top of a weldment of the hinge pin receivers.

Preferably, the length of the portion of the body 110 that spans vertically between one or more sets of guides is selected based on the distance between the weldments 208 of the upper and lower hinge pin receivers 202/203. By way of example, if the distance between the weldments 208 for the driver-side door is 18 inches, then the portion of the body 110 can be greater than 18 inches with the distance of the body located between the bottom of the crenellated void 112 of the first guide 101 and the top of the second guide 102 being slightly longer than 18 inches. Preferably, the length of the portion of the body that connects one set of guides is selected such that the weldments 208 can be positioned within the crenellated voids 112.

FIG. 4 shows a vehicle door 201 that has been removed from the vehicle body frame 200. The vehicle door 201 can include an upper and a lower hinge pin housing 204/205. The upper and a lower hinge pin housings 204/205 can house an upper and lower hinge pin 206/207, respectively. The upper hinge pin 206 can matingly engage with an opening in the form of a hole located at the top portion of the upper hinge pin receiver 202, and the lower hinge pin 207 can matingly engage with an opening located at the top portion of the lower hinge pin receiver 203. This mating engagement attaches the vehicle door 201 to the vehicle body frame 200.

Figure 6:
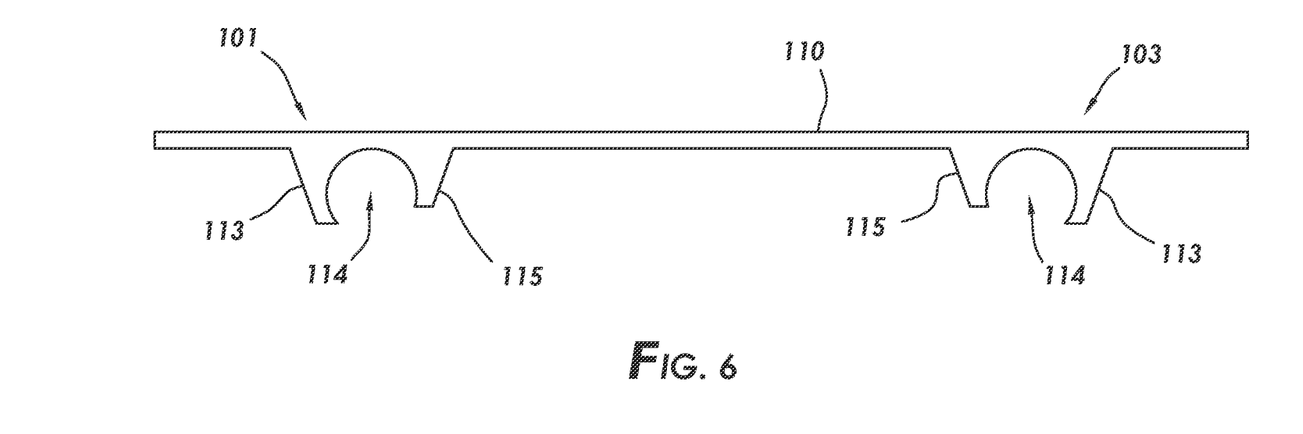
FIG. 6 is a top view showing the door guide and protector according to certain embodiments.
Figure 7:
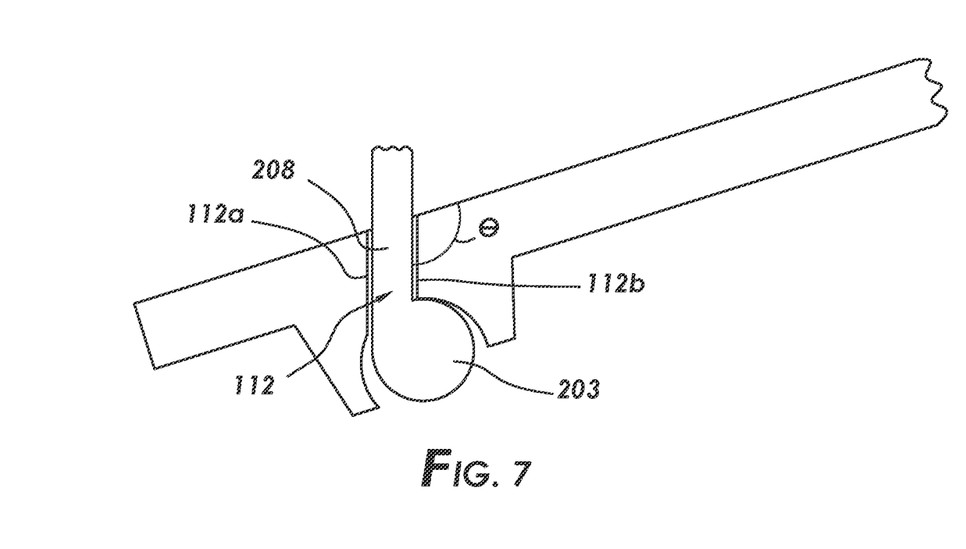
FIG. 7 is a top view schematic of the location and angle of a crenellated void in relation to a body of the door guide and protector according to certain embodiments.
Figure 8A:
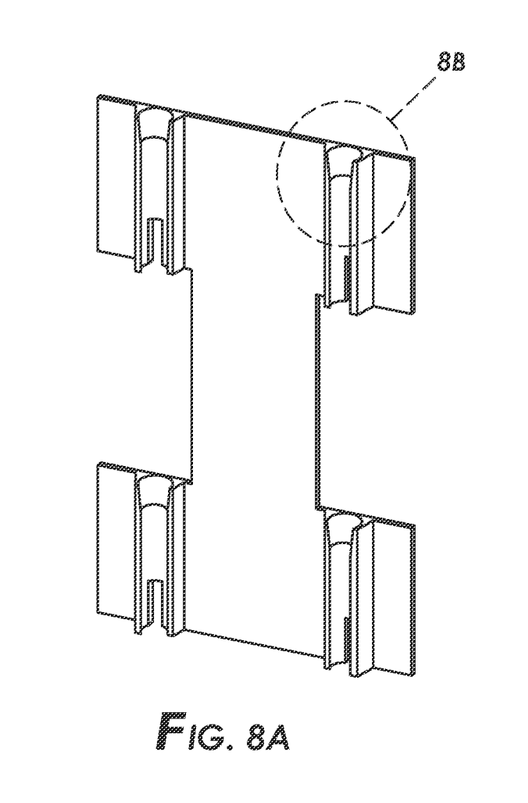
FIG. 8A is a side, perspective view of the combination device showing the guide according to certain other embodiments.
Figure 8B:
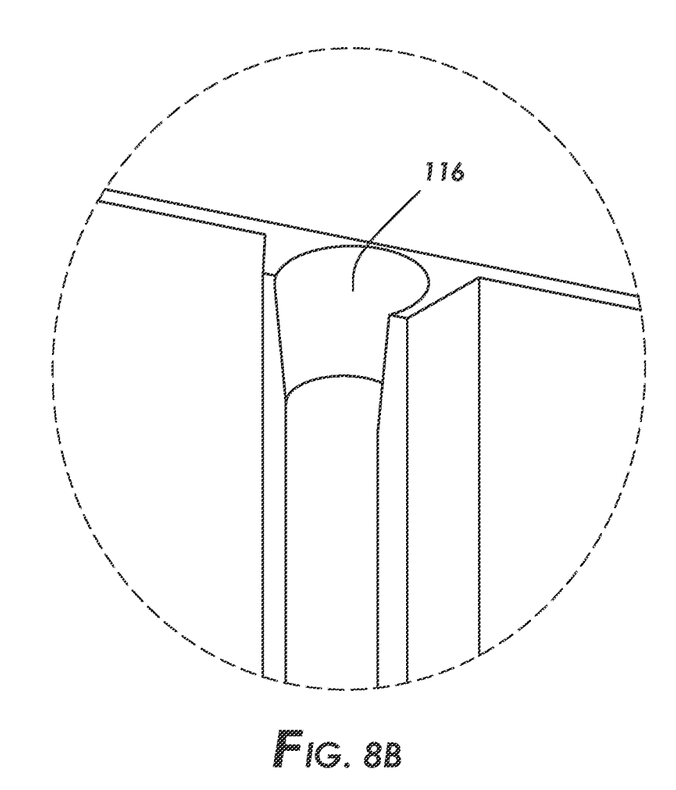
FIG. 8B is an enlarged view of FIG. 8A showing a chamfer according to the certain other embodiments.

A first set of guides, for example the first and second guides 101/102, can be configured to be used for the driver side of the vehicle and a second set of guides, for example the third and fourth guides 203/204, can be configured to be used for the passenger side of the vehicle. With reference to FIGS. 5-7, the upper and lower hinge pin receivers 202/203 can form two angles $\theta_1$ and $\theta_2$ with the weldments 208. The angles $\theta_1$ and $\theta_2$ can be different for the front doors and the rear doors. The forward curved portion 115 of both an upper guide and lower guide (i.e., a first set of guides) can be configured to correspond to the angle $\theta_1$, while the rear curved portion 113 can be configured to correspond to the angle $\theta_2$. As discussed above, the forward curved portion 115 and the rear curved portion 113 form a groove 114 for receiving the upper and a lower hinge pin housings 204/205 of the vehicle door 201. The distance that the forward and rear curved portions that protrude from a plane of the body can be the same or different (shown in the drawings as being different) and can be curved to match the outer profile of the upper and lower hinge pin receivers and upper and lower hinge pin housings. In this manner, the upper and lower hinge pin receivers can slidingly engage within the groove to mate with the crenellated voids, and the upper and lower hinge pin housings can slidingly engage within the groove for easy removal and attachment of the vehicle door.

The crenellated voids 112 can include a forward side 112a and a rear side 112b. The forward side 112a and the rear side 112b of the crenellated void 112 can form an angle $\theta$ with a plane of the body 110. The angle $\theta$ can be less than, equal to, or greater than 90°. The crenellated voids can be offset from a centerline of the grooves 114. The distance between the forward side 112a of the crenellated void 112 and the rear side 112b can vary and can be slightly larger than the width of the weldment 208. The angle $\theta$ and the distance between the forward side 112a and rear side 112b can be selected such that the crenellated voids 112 can rest completely onto the top of the weldments 208 and the forward curved portion 115 and the rear curved portion 113 match the angles $\theta_1$ and $\theta_2$ of the weldments 208. In this manner, the upper and a lower hinge pin housings 204/205 of the vehicle door 201 can easily be placed within the groove 114 and the upper and lower hinge pins 206/207 align with the holes in the upper and lower hinge pin receivers 202/203.

With reference to FIGS. 1, 2, and 6, and as discussed above, the door guide and protector 100 can include more than one set of guides, wherein each set of guides corresponds to a particular door of the vehicle. According to any of the embodiments, the door guide and protector 100 is positioned onto the vehicle body frame 200 such that the forward curved portion 115 is located closer towards the hood of the vehicle and the rear curved portion 113 is located closer to the rear of the vehicle. The following is a first example that assumes a difference in the length of the weldment and/or angles $\theta_1$ and $\theta_2$ of the upper and lower hinge pin receivers 202/203 between the front doors and the rear doors. In practice, and with reference to FIG. 1, the door guide and protector 100 can include 4 sets of guides, whereby the door guide and protector 100 is slid from the left to the right over the passenger-side front door such that the crenellated voids 112 of the fifth and sixth guides 105/106 are positioned on top of the weldments 208 of the passenger-side front door upper and lower hinge pin receivers 202/203. The door guide and protector 100 is then slid down towards the ground until the top of the crenellated voids 112 rest on the top of the weldments 208 and the grooves 114 are aligned with the holes of the upper and lower hinge pin receivers 202/203. The vehicle door 201 is then positioned adjacent to the fifth and sixth guides 105/106 such that the upper and a lower hinge pin housings 204/205 are located above the grooves 114. The door is then lowered towards the ground whereby the upper and a lower hinge pin housings 204/205 traverse within the groove 114 of the fifth and sixth guides 105/106 until the upper and lower hinge pins 206/207 enter the holes of the upper and lower hinge pin receivers 202/203. The process is repeated using the seventh and eighth guides 107/108 for the passenger-side rear door. For the driver-side doors, the door guide and protector 100 would be slid from the right to the left to align the crenellated voids 112 with the weldments 208. The driver-side front door can correspond to the third and fourth guides 103/104, and the driver-side rear door can correspond to the first and second guides 101/102.

The following is another example whereby the length of the weldments 208 and the angles $\theta_1$ and $\theta_2$ are the same for the front and rear doors. In practice, and with reference to FIG. 3, the door guide and protector 100 can include 2 sets of guides, whereby the first and second guides 101/102 can be used for both the front and rear driver-side doors, while the third and fourth guides 103/104 can be used for both the front and rear passenger-side doors. The process for attaching the door is the same as described in the preceding paragraph. FIG. 3 illustrates the third and fourth guides 103/104 being used for a passenger-side rear door.

According to any of the embodiments, the dimensions and configuration of each guide is selected such that the upper and lower hinge pin housings 204/205 can fit within and move downwards within the grooves 114 of each guide. For example, the forward curved portion 115 and the rear curved portion 113 can be configured such that the curved portions defining the grooves 114 corresponding to angles $\theta_1$ and $\theta_2$ of the upper and lower hinge pin receivers 202/203 such that the upper and a lower hinge pin housing 204/205 can slide within the grooves 114. As shown in FIGS. 9A and 9B, a top portion of each guide can further include a chamfer 116. The chamfer 116 can make it easier to position the upper and a lower hinge pin housings 204/205 within the grooves 114 for attaching the door to the vehicle.

According to other embodiments, there can be 1 set of guides that are physically separate from another set of guides—such as if the door guide and protector 100 shown in FIG. 3 was vertically cut down the middle of the body. Accordingly, there can be one set of guides for the driver-side doors and another set of guides for the passenger-side doors. According to other embodiments, there can be single door guide and protectors instead of a set of guides being vertically connected by the body. According to this embodiment, at least 2 single guides would need to be used—one for each of the upper and lower hinge pin receivers 202/203. A single door guide and protector can further include other components, for example a hole for placing a ring through, which can be used to keep the single devices together until use, so loss of one is less likely to occur.

The door guide and protector 100 can be made from a variety of materials, such as but not excluding, hardened plastics and semi-rigid plastics. The door guide and protector 100 can be made from a material that does not scratch the body of the vehicle when installing or uninstalling the door guide and protector. At least a portion of the back side of the door guide and protector 100 can further include a material. The material can be fabric, such as cottons, silks, velvets, etc. The material can also be a coating, such as silicone or other substances. The material can protect the vehicle body frame 200 from scratches or other damage during placement or removal of the door guide and protector 100 onto the hinge pin receivers 202/203. The material can have a slippery texture that can aid in placement and removal of the door guide and protector 100.

Methods of using the combination device are provided. For removing a vehicle door, the methods can include: opening the vehicle door; installing the door guide and protector onto the vehicle body (for example, using the driver-side guides for a driver-side door or using the passenger-side guides for a passenger-side door) by first sliding the device towards or away from the hood of the vehicle until a desired set of guides is located adjacent to the weldments of the upper and lower hinge pin receivers, and second aligning the crenellated voids with the upper and lower hinge pin receivers; moving the combination device down towards the ground until the top of the crenellated voids abut the top of the weldments; lifting the vehicle door up away from the ground, wherein the upper and lower hinge pin housings move within the grooves of the guides, until the hinge pins clear the hinge pin receivers and the hinge pin housings are no longer located within the guides; moving the vehicle door away from the vehicle; and uninstalling the combination device from the vehicle by disengaging the crenellated voids from engagement with the bottom hinge pin receivers.

For attaching a vehicle door, the methods can include: installing the combination device onto the vehicle body (for example, using the driver-side guides for a driver-side door or using the passenger-side guides for a passenger-side door) by first sliding the device towards or away from the hood of the vehicle until a desired set of guides is located adjacent to the weldments of the upper and lower hinge pin receivers, and second aligning the crenellated voids with the hinge pin receivers; moving the combination device down towards the ground until the top of the crenellated voids abut the top of the weldments; positioning the vehicle door such that the upper and lower hinge pin housings are aligned with the grooves of the guides; lowering the vehicle door towards the ground such that the hinge pin housings move within the grooves of the guides until the hinge pins matingly engage with an opening of the hinge pin receivers; and uninstalling the combination device from the vehicle by lifting the combination device upwards away from the ground to disengage the crenellated voids from engagement with the bottom hinge pin receivers and moving the combination device towards the hood or rear of the vehicle until the combination device clears the door.

Therefore, the apparatus, methods, and systems of the present disclosure are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present disclosure.

As used herein, the words "comprise," "have," "include," and all grammatical variations thereof are each intended to have an open, non-limiting meaning that does not exclude additional elements or steps. While the apparatus, systems, and methods are described in terms of "comprising," "containing," or "including" various components or steps, the apparatus, systems, and methods also can "consist essentially of" or "consist of" the various components and steps. It should also be understood that, as used herein, "first," "second," and "third," are assigned arbitrarily and are merely intended to differentiate between two or more guides, sets of guides, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A combination door guide and protector for attaching or removing vehicle doors comprising:
    a body;
    a first guide; and
    a second guide, wherein each of the first guide and the second guide comprise:
        a forward curved portion;
        a rear curved portion; and
        a crenellated void,
    wherein the forward and rear curved portions extend outwardly away from a plane of the body and form a groove within the guide, and wherein the body extends away from both sides of the forward and rear curved portions.

2. The combination door guide and protector according to claim 1, wherein the first and second guides are vertically aligned with each other.

3. The combination door guide and protector according to claim 2, wherein at least a portion of the body vertically connects the first and second guides.

4. The combination door guide and protector according to claim 3, wherein the body does not extend below the crenellated voids of the first and second guides.

5. The combination door guide and protector according to claim 2, wherein the first and second guides are a first set of guides.

6. The combination door guide and protector according to claim 5, further comprising a second set of guides, wherein the second set of guides comprise a third guide and a fourth guide, wherein each of the third guide and the fourth guide comprise: a forward curved portion; a rear curved portion; and a crenellated void, and wherein the third and fourth guides are vertically aligned with each other.

7. The combination door guide and protector according to claim 6, wherein the first set of guides is configured for use on driver-side vehicle doors, and wherein the second set of guides is configured for use on passenger-side vehicle doors.

8. The combination door guide and protector according to claim 6, further comprising:
    a third set of guides, wherein the third set of guides comprise a fifth guide and a sixth guide; and
    a fourth set of guides, wherein the fourth set of guides comprise a seventh guide and an eighth guide,
    wherein each of the fifth, sixth, seventh, and eighth guides comprise a forward curved portion, a rear curved portion, and a crenellated void, wherein the fifth and sixth guides are vertically aligned with each other, and wherein the seventh and eighth guides are vertically aligned with each other.

9. The combination door guide and protector according to claim 8, wherein the first set of guides is configured for use on a front driver-side vehicle door, wherein the second set of guides is configured for use on a rear driver-side vehicle door, wherein the third set of guides is configured for use on a front passenger-side vehicle door, and wherein the fourth set of guides is configured for use on a rear passenger-side vehicle door.

10. The combination door guide and protector according to claim 9, wherein the body extends between: the rear curved portion of the first guide and the forward curved portion of the third guide; the rear curved portion of the second guide and the forward curved portion of the fourth guide; the rear curved portion of the fifth guide and the forward curved portion of the seventh guide; and the rear curved portion of the sixth guide and the forward curved portion of the eighth guide.

11. The combination door guide and protector according to claim 1, further comprising a weldment extender positioned adjacent to the first guide and the second guide.

12. The combination door guide and protector according to claim 11, wherein the weldment extenders are located on a back side of the first and second guides and extend a distance away from the back side of the first and second guides.

13. The combination door guide and protector according to claim 12, wherein the weldment extenders span partially or wholly from a top portion of the first and second guides to a top of the crenellated voids.

14. The combination door guide and protector according to claim 1, wherein a forward curved portion and a rear curved portion of the crenellated voids are configured to slidingly engage with an outside of an upper hinge pin receiver and a lower hinge pin receiver attached to a vehicle frame of a vehicle via a weldment.

15. The combination door guide and protector according to claim 14, wherein the forward curved portion and the rear curved portion of the crenellated voids and a width of the crenellated voids are configured to secure the combination door guide and protector to the vehicle frame after placement of the first guide and the second guide over the upper hinge pin receiver and the lower hinge pin receiver.

16. The combination door guide and protector according to claim 1, wherein the grooves of the first and second guides are configured to receive an upper hinge pin housing and a lower hinge pin housing.

17. The combination door guide and protector according to claim 1, wherein a top portion of the first and second guides further comprises a chamfer.

18. The combination door guide and protector according to claim 1, wherein the door guide and protector is made from a hardened plastic or a semi-rigid plastic.

19. A method for removing a vehicle door from a vehicle frame comprising:
　A) opening the vehicle door, wherein the vehicle door comprises an upper hinge pin housing that houses an upper hinge pin and a lower hinge pin housing that houses a lower hinge pin;
　B) installing a combination door guide and protector onto the vehicle frame, wherein the combination door guide and protector comprises:
　　1) a body; and
　　2) a first guide and a second guide, wherein each of the first guide and the second guide comprise:
　　　i) a forward curved portion;
　　　ii) a rear curved portion; and
　　　iii) a crenellated void,
　　wherein the forward and rear curved portions extend outwardly away from a plane of the body and form a groove within the guide, and wherein the body extends away from both sides of the forward and rear curved portions;
　C) aligning the crenellated void of the first guide with an upper hinge pin receiver and the crenellated void of the second guide with a lower hinge pin receiver, wherein the upper and lower hinge pin receivers are attached to the vehicle frame via weldments;
　D) moving the combination door guide and protector down towards the ground until a top of the crenellated voids abut a top of the weldments and the forward and rear curved portions are engaged with the upper and lower hinge pin receivers;
　E) lifting the vehicle door up away from the ground, wherein the upper and lower hinge pin housings move within the grooves of the guides, until the upper and lower hinge pins clear the upper and lower hinge pin receivers and the upper and lower hinge pin housings are no longer located within the guides;
　F) moving the vehicle door away from the vehicle; and
　G) uninstalling the combination device from the vehicle by disengaging the crenellated voids from engagement with the upper and lower hinge pin receivers.

20. A method for attaching a vehicle door to a vehicle frame comprising:
　A) installing a combination door guide and protector onto the vehicle frame, wherein the combination door guide and protector comprises:
　　1) a body; and
　　2) a first guide and a second guide, wherein each of the first guide and the second guide comprise:
　　　i) a forward curved portion;
　　　ii) a rear curved portion; and
　　　iii) a crenellated void,
　　wherein the forward and rear curved portions extend outwardly away from a plane of the body and form a groove within the guide, and wherein the body extends away from both sides of the forward and rear curved portions;
　B) aligning the crenellated void of the first guide with an upper hinge pin receiver and the crenellated void of the second guide with a lower hinge pin receiver, wherein the upper and lower hinge pin receivers are attached to the vehicle frame via weldments;
　C) moving the combination door guide and protector down towards the ground until a top of the crenellated voids abut a top of the weldments and the forward and rear curved portions are engaged with the upper and lower hinge pin receivers;
　D) positioning the vehicle door adjacent to the first and second guides such that an upper hinge pin housing and a lower hinge pin housing located on the vehicle door are aligned with the grooves of the guides;
　E) lowering the vehicle door towards the ground, wherein the upper and lower hinge pin housings move within the grooves of the guides until an upper hinge pin and a lower hinge pin matingly engage with an opening of the upper and lower hinge pin receivers; and
　F) uninstalling the combination device from the vehicle by disengaging the crenellated voids from engagement with the upper and lower hinge pin receivers.

* * * * *